Aug. 4, 1959     G. H. RAWCLIFFE     2,898,535
INDUCTION MOTORS

Filed July 10, 1958     4 Sheets-Sheet 1

INVENTOR
Gordon Hindle Rawcliffe
BY
Stevens, Davis, Miller & Mosher
ATTORNEYS

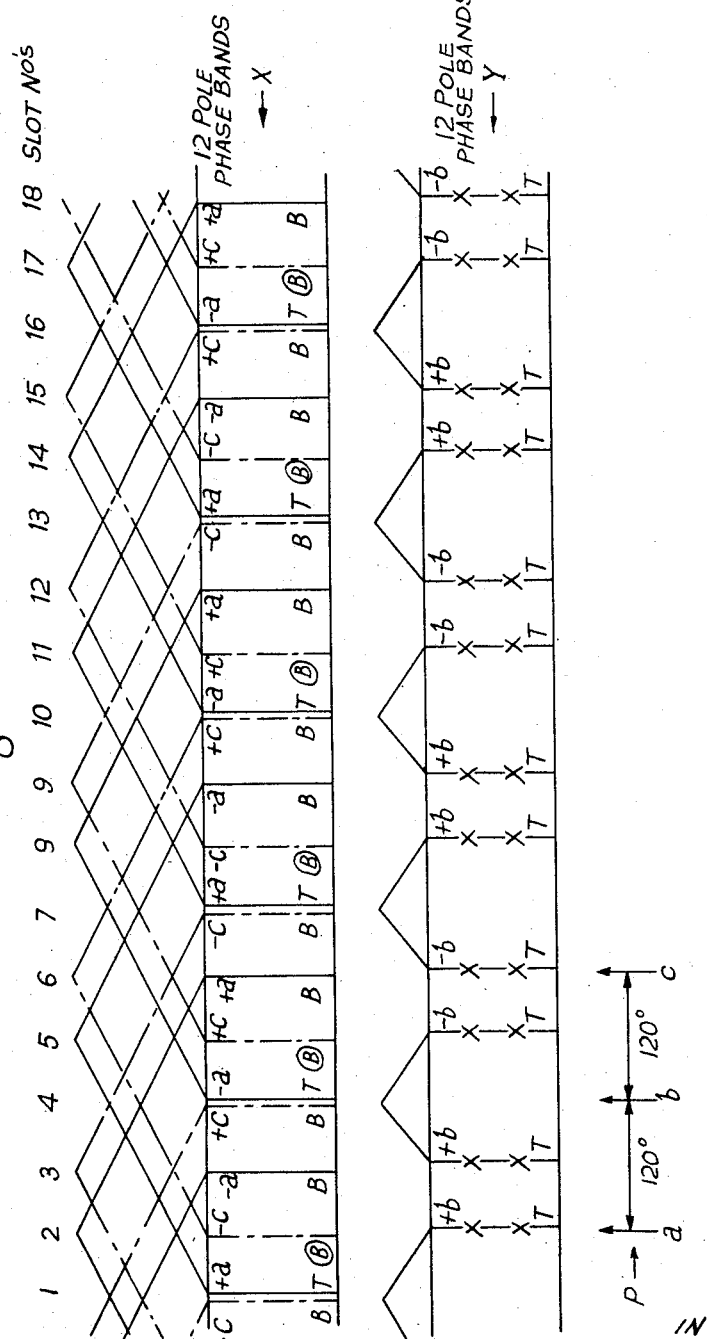

United States Patent Office 2,898,535
Patented Aug. 4, 1959

2,898,535

INDUCTION MOTORS

Gordon Hindle Rawcliffe, Clifton, Bristol, England, assignor to National Research Development Corporation, London, England Application July 10, 1958, Serial No. 747,722

Claims priority, application Great Britain July 15, 1957

5 Claims. (Cl. 318—224)

This invention relates to alternating current electric induction motors and has for its object to provide a 3-phase A.C. pole-changing induction motor adapted to run at two speeds in the ratio of 3:1, having improved performance characteristics over known machines of this type.

It is known to provide three-phase motors in which, by changing the connections to the windings, the effective number of poles is changed so that the motor can be made to run at different speeds. Satisfactory motors are known, and widely used, for two speeds related in the ratio 2:1. When attempts have been made to provide speeds in the ratio 3:1, many difficulties have been experienced. Not the least of these is in providing a motor which is free from a tendency to "crawl" when connected for operation at one speed or the other.

"Crawling" is the operation of a motor when it runs at a sub-multiple of its proper running speed. This condition arises from the harmonic content of the magneto-motive force waveform. The harmonics of the magneto-motive force waveform have the same effect as if the motor were wound with the larger number of poles to which the "crawling" speed corresponds. Of the harmonics present in the M.M.F. waveform, the seventh hamonic is the most serious in producing crawling, since the third harmonics produced by the three phases tend to neutralise one another and the fifth harmonic corresponds to a backwardly rotating field.

A 3-phase pole-changing induction motor has been described having three phase windings, each of 120° spread, each divisible into three 40° sections, and adapted to be connected alternatively as a 3-phase delta winding of 120° phase spread or a 3-phase star winding of 120° phase spread, the delta winding omitting one 40° section of each of the phase windings. Such a motor requires eleven control leads for effecting the alternative connections of the windings.

There has also been described a 3-phase pole-changing induction motor for operation at alternative speeds in the ratio 3:1, having three-phase single-layer full-pitch windings of 60° spread wherein, at the higher speed, only one-third of the coils, for a constant H.P. machine, or two-thirds of the coils, for a constant torque machine, are in circuit, the coils in circuit at the higher speed being wound for a 300% pole pitch at the lower speed. Such a motor requires only nine control leads for switching the windings when operating as a constant torque machine.

It has now been found by theoretical analysis and by practical test that machines with a full-pitch 60° phase spread winding crawl badly, which offsets the advantage of the simpler switching connections.

According to the present invention, a 3-phase A.C. pole-changing induction motor has phase winding sections adapted for connections alternatively to provide a 4-pole delta-connected winding or a 12-pole star-connected winding, for providing operating speeds in the ratio of 3:1, the windings having 60° phase spread, the delta-connected winding omitting one 20° section of each of the phase windings and the winding being chorded to ⅚ of the full pole-pitch under 4-pole working conditions, which is equivalent to ⅔ of full pole-pitch under 12-pole working conditions.

According to one form of the invention, the motor has a double layer winding, that is, having two coil sides per slot, and, as the result of chording, the winding sections employed in 4-pole delta connection occupy fully the centre third of each successive group of slots and half fill the two outer thirds of the group of slots.

According to another form of the invention, the conductors of the 4-pole delta winding arranged in the outer slots of each group of slots occupy the bottoms of the slots and the tops of the slots accommodate further coils having a short pitch corresponding to ⅔ of a pole pitch at 12-pole operation, said further coils together providing one phase of the 12-pole star-connected winding.

In order that the invention may be readily carried into effect, two practical embodiments will now be particularly described, by way of example, with reference to the drawings accompanying this specification, of which:

Fig. 3 is a winding diagram of a modified form of chorded winding;

Figure 1:
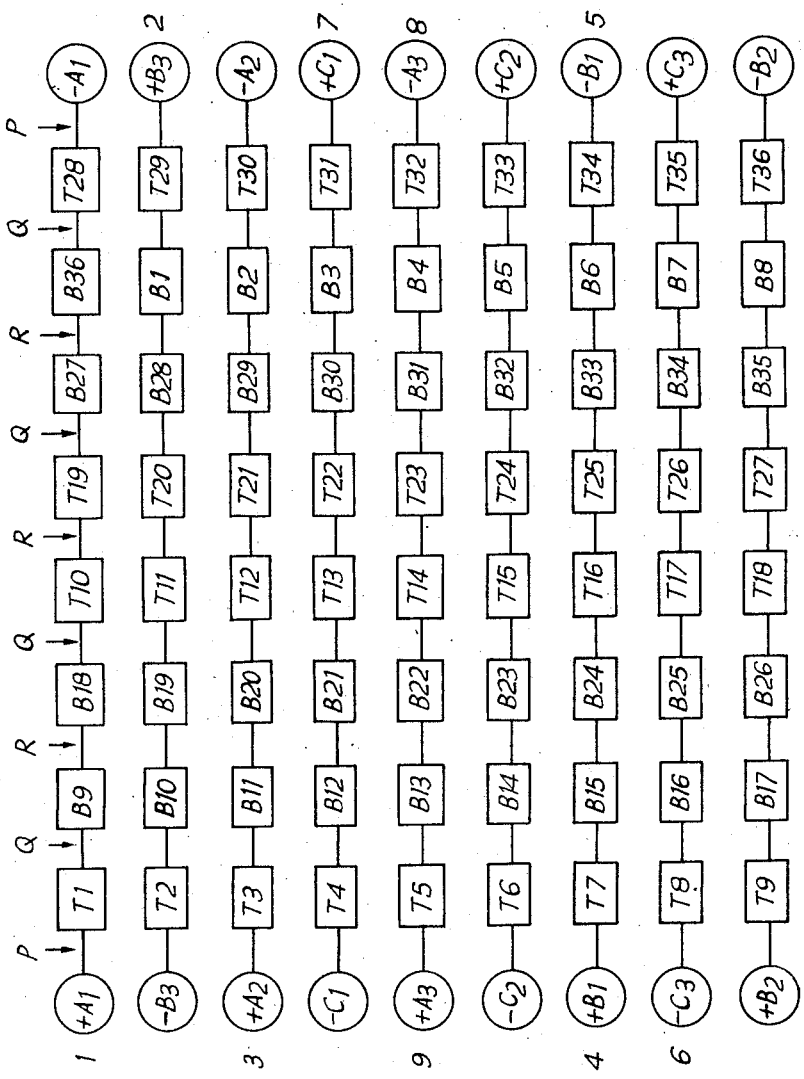
Fig. 1 is a winding diagram of a 3-phase pole-changing induction motor, for 4-pole or 12-pole operation, wound on a 36-slot stator and having the 4-pole winding chorded ⅚ of the full pole-pitch of 9 slots.
Figure 4A:
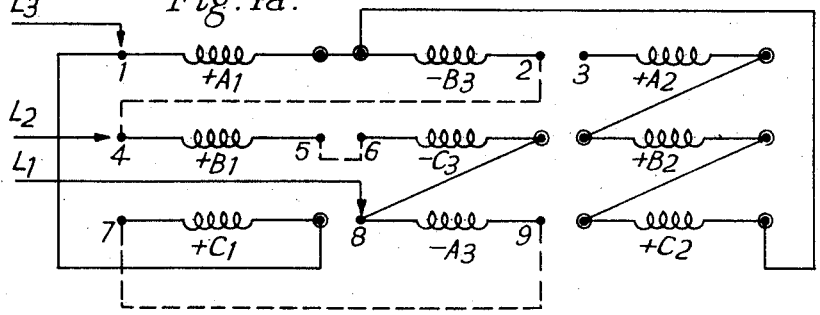
Figure 4B:
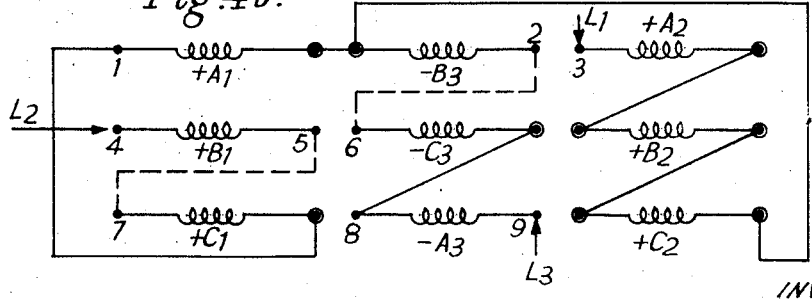
Figure 5A:
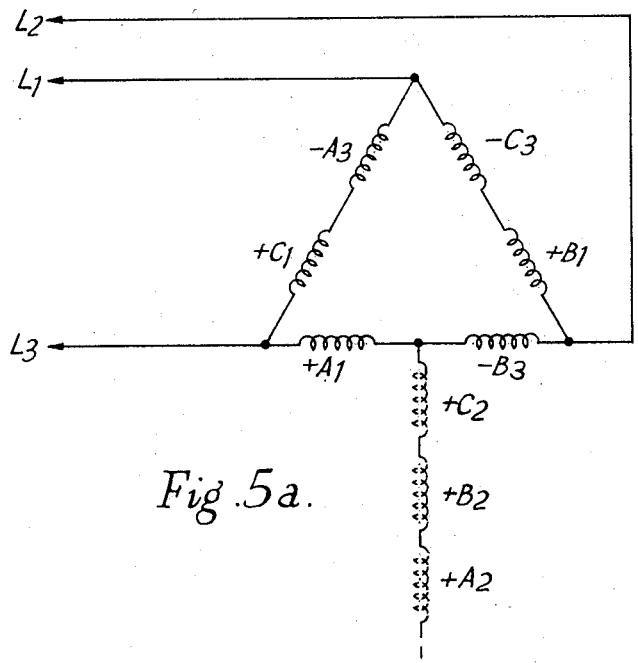
Figure 5B:
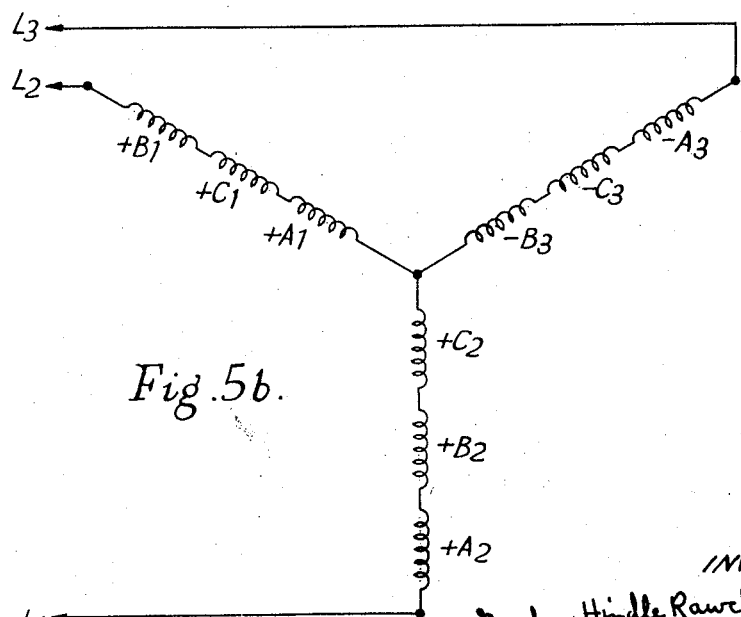

Figs. 4a and 4b are circuit diagrams showing connections to the winding sections of either the winding of Fig. 1 or the winding of Fig. 3 for 4-pole and 12-pole operation, and Figs. 5a and 5b are schematic circuit diagrams of the windings corresponding respectively to Figs. 4a and 4b.

In the drawings, Fig. 1 shows a winding diagram of a 3-phase motor designed for operation with 4 poles or 12 poles to provide operating speeds in the ratio 3:1. The stator of the machine is slotted to provide 36 slots so that the full pole pitch is nine slots under 4-pole working conditions.

Alternatively, for a larger machine, a stator having 72 slots could be used.

The winding of the present example is a double-layer winding and is ⅚ chorded, the coil pitch being 8 slots of the 9 slot pole pitch. The full winding of this example comprises 36 coils with 60° phase spread.

In Fig. 1 the positions of the coil sides is indicated in the conventional manner, the letters T and B indicating the top of a slot and the bottom of a slot respectively. The numerals which follow the reference letter indicate the slots arbitrarily numbered in sequence.

The connections indicated at P are lead-out conductors; those indicated at Q are coil throws and those at R are connections. The left-hand and right-hand marginal circles indicate the ends of the various winding sections and the marking thereof corresponds to those of Figs. 4a, 4b, and Figs. 5a, 5b.

In this arrangement, it will be noted that all the coils are indentical.

Figure 2:
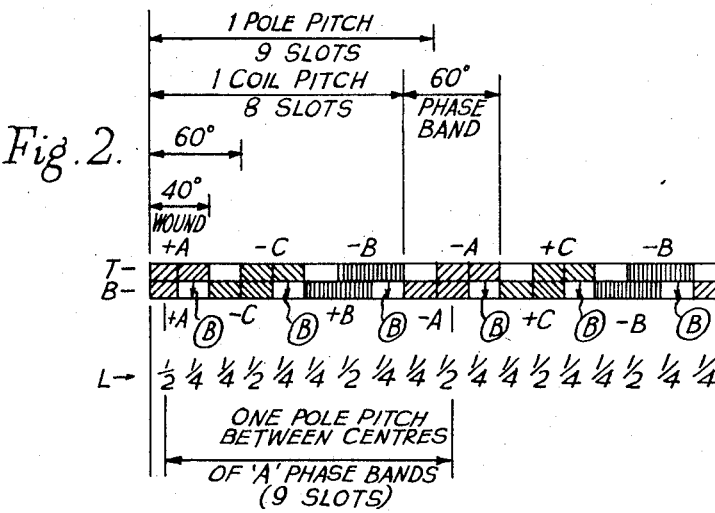
Fig. 2 is a phase band diagram corresponding to the winding of Fig. 1, showing the 4-pole winding shaded and indicating how this may be modified to give the winding of Fig. 3, where

Fig. 2 shows the phase band diagram for the part of the winding of Fig. 1 which is used for 4-pole operation. Fig. 2 also shows the equivalence of the ⅚ chorded winding, two-thirds wounds, to a full pitch winding unevenly distributed in the form: ½, 1, ½. The references +A, −A and so on indicate opposite sides of corresponding coils. The letters T, B indicate top and bottom of the slots respectively. The unshaded slot positions indicate the omitted coils for 4-pole operation. The fractions indicated by the letter L refer to the relative conductor loadings in 4-pole operation.

It will be noted in this figure that the centre third of each successive group of slots is fully occupied by the windings and the two outer thirds of the group are half-filled.

The arrows indicated by the inset letter B denote those coil sides which are pushed to the bottom of their slots in the modified winding shown in Fig. 3.

In Fig. 3, these same coil sides are indicated by the inset letter B. The letters T and B indicate respectively top and bottom of the slots as before. The winding indicated at X shows the further coils used in 12-pole operation which occupy the unshaded slot positions of the diagram of Fig. 2 after the coil sides B (inset) have been pushed to the bottom of the slots. For this winding X the soil pitch is slot 1 to slot 9 and so on, that is, eight slots of the 4-pole pitch of nine slots. This winding is identical to two-thirds of the winding of Fig. 1.

The 12-pole phase hands Y are indicated by the lower case letter references, in the lower part of Fig. 3. The winding Y is wound in the upper halves of the outer slots of the groups of three slots shown in Fig. 2, so that the windings X and Y of Fig. 3 may be regarded as being superimposed. It will be noted that the coil pitch of the winding Y is slot 1 to slot 3 and so on, that is two slots, so that the winding Y is referred to herein as the short-pitch winding and has a pitch of ⅔ of a full pole pitch for 12-hole operation. The diagram P at the bottom of Fig. 3 indicates the centre line of poles of the individual phases.

Figs. 4a, 4b show the connections between the coil sections, the connections in full lines being permanent connections. The connections shown in broken lines are the connections provided by a speed-controller switch which the numbered coil terminals and broken-line connections of the two figures represent. The un-numbered and circled terminals are joined by the permanent connections.

Figs. 4a, 4b are to be considered together with Figs. 5a, 5b respectively, the coil section references in the two sets of drawings corresponding to each other and to those of Fig. 1.

Figs. 4a and 5a show the winding arrangement for 4-pole delta-connected, high-speed operation. In this mode of operation, the short-pitch winding +A₂, +B₂, +C₂, of the modified winding of Fig. 3 is unused as is one third of the whole winding of Fig. 1.

Figs. 4b and 5b show the winding arrangement for 12-pole, star-connected, low-speed operation. In this mode of operation, all the windings are used.

Particularly from Figs. 4a, 4b, it will be noted that nine connections from the winding are required for the alternative connections.

Tabulated below are corresponding performance figures for three 3-phase, pole-changing, 3:1 speed ratio induction motors, machine A being the full-pitch 120° spread machine referred to first in the preamble, machine B having the chorded winding of Fig. 1 and machine C having the short-pitch 12-pole winding of Fig. 3.

|  | Machine A | Machine B | Machine C |
| --- | --- | --- | --- |
| Line volts | 440 | 474 | 475 |
| 4-pole Output, H.P | 4.0 | 4.1 | 4.2 |
| Full-load Slip, percent | 6.7 | 6.7 | 7.0 |
| Full-load Efficiency, percent | 80 | 80.5 | 81.5 |
| Power Factor | 0.88 | 0.88 | 0.88 |
| 12-pole Output, H.P | 0.81 | 0.82 | 0.9 |
| Full-load Slip, percent | 10.0 | 8.5 | 9.0 |
| Full-load Efficiency, percent | 57 | 57.5 | 58.5 |
| Power Factor | 0.58 | 0.54 | 0.56 |

The seventh-harmonic M.M.F. content at either working speed for both of the windings of Figs. 1 and 3 is found to be considerably less than in a standard industrial full-pitch winding. There is no suggestion of crawling, even when the machines are started against a heavy torque.

It is considered that the winding of Fig. 1 may be preferred for mass-production since the coils are identical and thus require no special skill in winding. However, the modified winding of Fig. 3 gives the better performance and the improvement is not offset by any other disadvantages in performance.

What I claim is:

1. A 3-phase A.C. pole changing induction motor having phase winding sections adapted for connection alternatively to provide a 4-pole delta-connected winding of a 12-pole star-connected winding, for providing operating speeds in the ratio 3:1, the windings having 60° phase spread, the delta-connected winding omitting one 20° section of each of the phase windings and the winding being chorded to 8/9 of the full pole-pitch under 4-pole working conditions, which is equivalent to ⅔ of full pole-pitch under 12-pole working conditions.

2. A 3-phase A.C. pole-changing induction motor as claimed in claim 1, having a double layer winding, that is, having two coil sides per slot, the winding sections employed in 4-pole delta connection occupying fully the centre third of each successive group of slots and half filling the two outer thirds of the group of slots.

3. A 3-phase A.C. pole-changing induction motor as claimed in claim 2, in which the conductors of the 4-pole delta winding arranged in the outer slots of each group of slots occupy the bottoms of the slots and the tops of the slots accommodate further coils having a short pitch corresponding to ⅔ of a pole-pitch at 12-pole operation, said further coils together providing one phase of the 12-pole star-connected winding.

4. A 3-phase A.C. pole-changing induction motor as claimed in claim 2, having the phase windings wound on a stator provided with 36 slots, each phase winding being chorded to 8 slots of the full pole-pitch of 9 slots, the phase winding sections used in the 4-pole delta connection occupying groups of three slots, the middle slot of each group of three being fully filled with the said winding sections and the two outer slots of each group each being half filled with the said winding sections.

5. A 3-phase A.C. pole-changing induction motor as claimed in claim 4, in which the phase winding sections used in the 4-pole delta connection which are arranged in the two outer slots of each group of three occupy the bottoms of the two slots and the tops of the two slots accommodate further coils of short pitch corresponding to 2 slots of the full pole-pitch of 3 slots at 12-pole operation.

No references cited.